United States Patent [19]

Davis

[11] Patent Number: 4,826,020
[45] Date of Patent: May 2, 1989

[54] RECORD ALBUM STORAGE AND DISPLAY DEVICE

[76] Inventor: Eric N. Davis, 62 Undine Street, Tooting, London SW, 17-8PR, United Kingdom

[21] Appl. No.: 36,363

[22] Filed: Apr. 8, 1987

[51] Int. Cl.⁴ .............................................. A47G 29/00
[52] U.S. Cl. ...................................... 211/40; 211/126
[58] Field of Search ................... 211/40, 41, 1.5, 126, 211/13; 312/60, 9, 10, 15, 17; 273/148 B; 369/36

[56] References Cited

U.S. PATENT DOCUMENTS

| | | | |
|---|---|---|---|
| 1,335,967 | 4/1920 | Howard | 211/40 X |
| 3,245,736 | 4/1966 | Douthit | 211/40 X |
| 4,235,490 | 11/1980 | Schwartz et al. | 211/41 X |
| 4,594,700 | 6/1986 | Takahashi et al. | 369/36 X |
| 4,654,799 | 3/1987 | Ogahi et al. | |
| 4,661,806 | 4/1987 | Peters et al. | 211/13 X |

Primary Examiner—Alvin C. Chin-Shue
Assistant Examiner—Sarah A. Lechok-Eley
Attorney, Agent, or Firm—Richard L. Miller

[57] ABSTRACT

A record album storage and display device is provided which stores record albums or other media in a cabinet with one or more compartments. A database contained in printed form on an endless belt also contains a code corresponding to each catalogued record. A keyboard is provided through which the code may be entered. Entering the code activates a visual indicator placed proximate to each record so that the record may be located without examining its label. The cabinet, database and keyboard may be self contained, or a separate console may be provided containing the database and keyboard. The separate console may be connected to the record cabinet via a cable or via an infrared cableless link.

12 Claims, 1 Drawing Sheet

RECORD ALBUM STORAGE AND DISPLAY DEVICE

BACKGROUND OF THE INVENTION

The present invention relates generally to media cataloging and locating systems and, more specifically, to storage devices which contain the cataloged media and provide a system for locating items without having to examine every item directly.

Phonograph records, books, and other print and non-print media are commonly stored vertically in storage cabinets and, when the number of catalogued objects is large, selection of a desired media may be tiresome as the labels on the stored media may be difficult to read. This problem is exacerbated by conditions of less than optimal lighting or when the visual acuity of the user is deficient.

SUMMARY OF THE INVENTION

The primary object of the present invention is to provide a record album and storage device which allows the user to store and locate a large number of catalogued media, such as record albums.

Another object of the present invention is to provide a record álbum and storage device which allows the user to enter, in printed form, a database of the contents of the media on an endless belt, so that by electrically advancing the belt a code corresponding to each database record can be visually determined.

A further object of the present invention is to provide a record album and storage device with a keyboard which can be used to enter the code analogous to each media stored in the system, so that an indicator device placed proximate to each of the stored media is activated.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows.

DETAILED DESCRIPTION OF THE PREFERRED EMBODIMENTS

Figure 1:
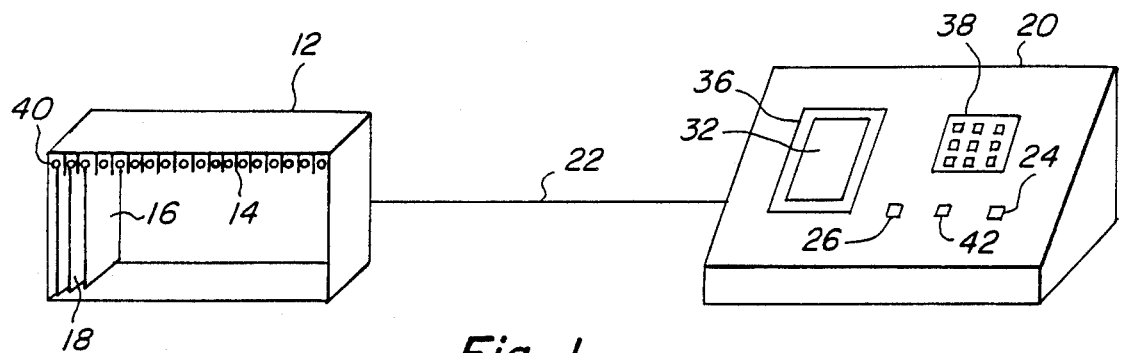
FIG. 1 is a diagrammatic view of one embodiment of the invention illustrating a one-compartment storage cabinet with separate control console.
Figure 2:
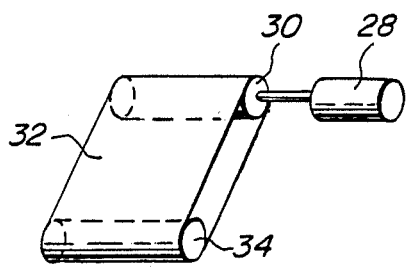
FIG. 2 is a partial perspective view of the endless belt and drive system contained within the invention.

In FIG. 1, the rectangular open-front cabinet 12 is equipped with flanges, typified by 14, which separate media such as phonograpah records 16 and 18. One embodiment of the invention uses an external control console 20 connected to cabinet 12 via cable 22. Alternatively, instead of connecting via a cable, an infrared cableless link could be used. In operation, power switch 24 is first activated to provide power to the invention. Scan button 26 is momentarily depressed supplying power to motor 28 which drives active roller 30. Endless belt 32 then advances with the additional guidance of passive roller 34. The contents of the media database are imprinted on the outer surface of endless belt 32 including a code number corresponding to each of the catalog entries. Alternatively, adhesive labels containing this information may be attached to the belt. Endless belt 32 is viewed through window 36 which may be hinged to allow access to the belt for data entry or maintenance.

Once the appropriate code has been determined, the operator inputs the code via alphanumeric keyboard 38. Each catalog entry when imnputted to keyboard 38 causes an indicator device, typified by indicator lamp 40 to glow. One lamp will be illuminated for each set of keyboard entries. Using this system the user can find media quickly without physically examining it. When finished using the device, the operator depresses the reset button 42 which resets the system and extinguishes all illuminated lamps.

Figure 3:
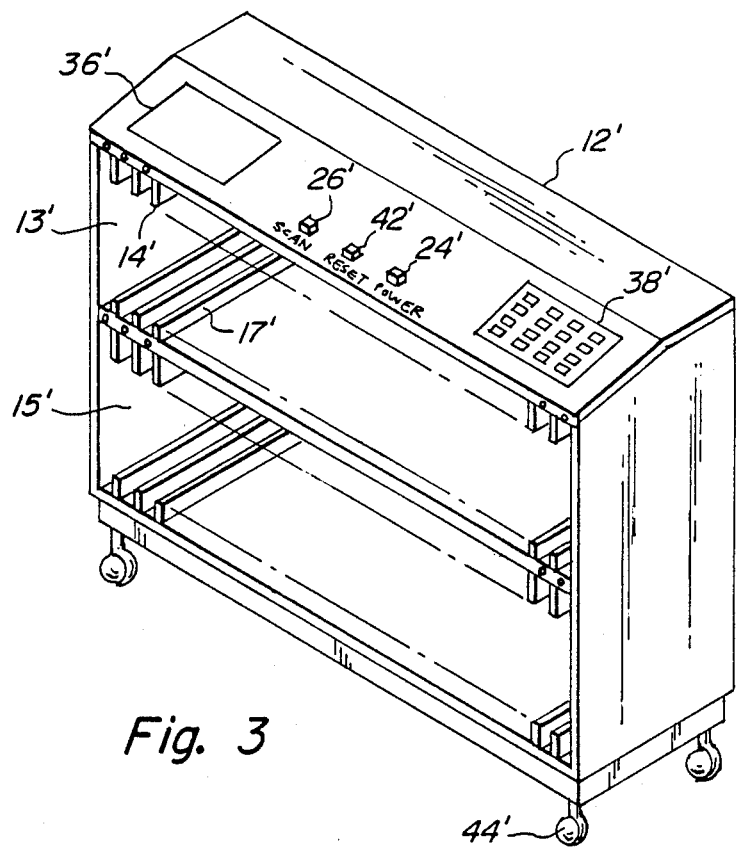
FIG. 3 is a perspective view of another embodiment of the invention illustrating a two-compartment cabinet with control console components contained within the storage cabinet itself.

In FIG. 3 another embodiment of the invention integrates the console components into cabinet 12' which has two record compartments 13' and 15'. Each compartment has both upper and lower flanges, typified by 14' and 17'. The flanges shown are relatively short to provide for phonograph records of approximately the same height as the compartments; however, longer flanges may be used for shorter records. The functional components integrated into cabinet 12' include window 36', scan button 26', reset button 42', power switch 24', and keyboard 38'. Rolling casters, typified by 44' have been added for mobility.

While certain novel features of this invention have been shown and described and are pointed out in the annexed claims, it will be understood that various omissions, substitutions and changes in the forms and the details of the device illustrated and in its operation can be made by those skilled in the art without departing from the spirit of the invention.

What is claimed is:

1. A record album storage and display device, comprising:
   (a) a cabinet with rectangular compartments and are open front wherein each of said compartments have vertical flanges projecting downward from the top and optionally projecting upward from the bottom such that said flanges lie in the same plane, wherein said flanges form slots into which catalogued media, such as record albums, may be inserted;
   (b) indicator devices placed proximate to said slots;
   (c) control means integral to said cabinet for causing said indicator devices to operate;
   (d) a database integral to said cabinet containing the contents of said catalogued media; and,
   (e) reference means for correlating the contents of said database to the operation of said control means such that the contents of said media may be extracted from said database and input to said control means thereby causing an appropriate said indicator device to uniquely point to a desired media without having to examine the media itself, wherein said database containing the contents of said catalogued media comprise an endless belt whose outer surface has a visible analog of the contents of said media and are visible, through a window which said database may be viewed, and a drive means for moving said endless belt.

2. A record album storage and display device, as recited in claim 1, wherein said drive means comprise a passive roller, an active roller, and a motor drive, wherein said belt passes over both of said rollers.

3. A record album storage and display device, as recited in claim 2, further comprising an electrical power source for said motor drive and a roll button whose activation causes said belt to operate.

4. A record album storage and display device, as recited in claim 1, wherein said window is hinged to permit access to said belt.

5. A record album storage and display device, as recited in claim 1, further comprising adhesive labels, whereby the contents of said database may be imprinted upon said labels and whereby said labels may be adhesively attached to the outer surface of said belt.

6. A record album storage and display device, comprising:
   (a) a cabinet with rectangular compartments and an open front wherein each of said compartments have vertical flanges projecting downward from the top, and, optionally projecting upward from the bottom such that said flanges lie in the same plane, wherein said flanges form slots into which catalogued media, such as record albums, may be inserted;
   (b) indicator devices placed proximate to said slots;
   (c) control means, contained in a separate console, for causing said indicator devices to operate;
   (d) a database, contained in said separate console, containing the contents of said catalogued media; and,
   (e) reference means for correlating the contents of said database to the operation of said control means such that the contents of said media may be extracted from said database and input to said control means thereby causing an appropriate said indicator device to uniquely point to a desired media without having to examine the media itself, wherein said database containing the contents of said catalogued media comprise an endless belt whose outer surface has a visible analog of the contents of said media and are visible, a window through which said database may be viewed, and a drive means for moving said endless belt.

7. A record album storage and display device, as recited in claim 6, wherein said drive means comprise a passive roller, an active roller, and a motor drive, wherein said belt passes over both of said rollers.

8. A record album storage and display device, as recited in claim 7, further comprising an electrical power source for said motor drive and a roll button whose activation causes said belt to operate.

9. A record album storage and display device, as recited in claim 6, wherein said window is hinged to permit access to said belt.

10. A record album storage and display device, as recited in claim 6, further comprising adhesive labels, whereby the contents of said database may be imprinted upon said labels and whereby said labels may be adhesively attached to the outer surface of said belt.

11. A record album storage and display device, as recited in claim 6, wherein said cabinet and said console are connected by a cable.

12. A record album storage and display device, as recited in claim 6, wherein said cabinet and said console are connected by an infrared link.

* * * * *